Patented June 20, 1950

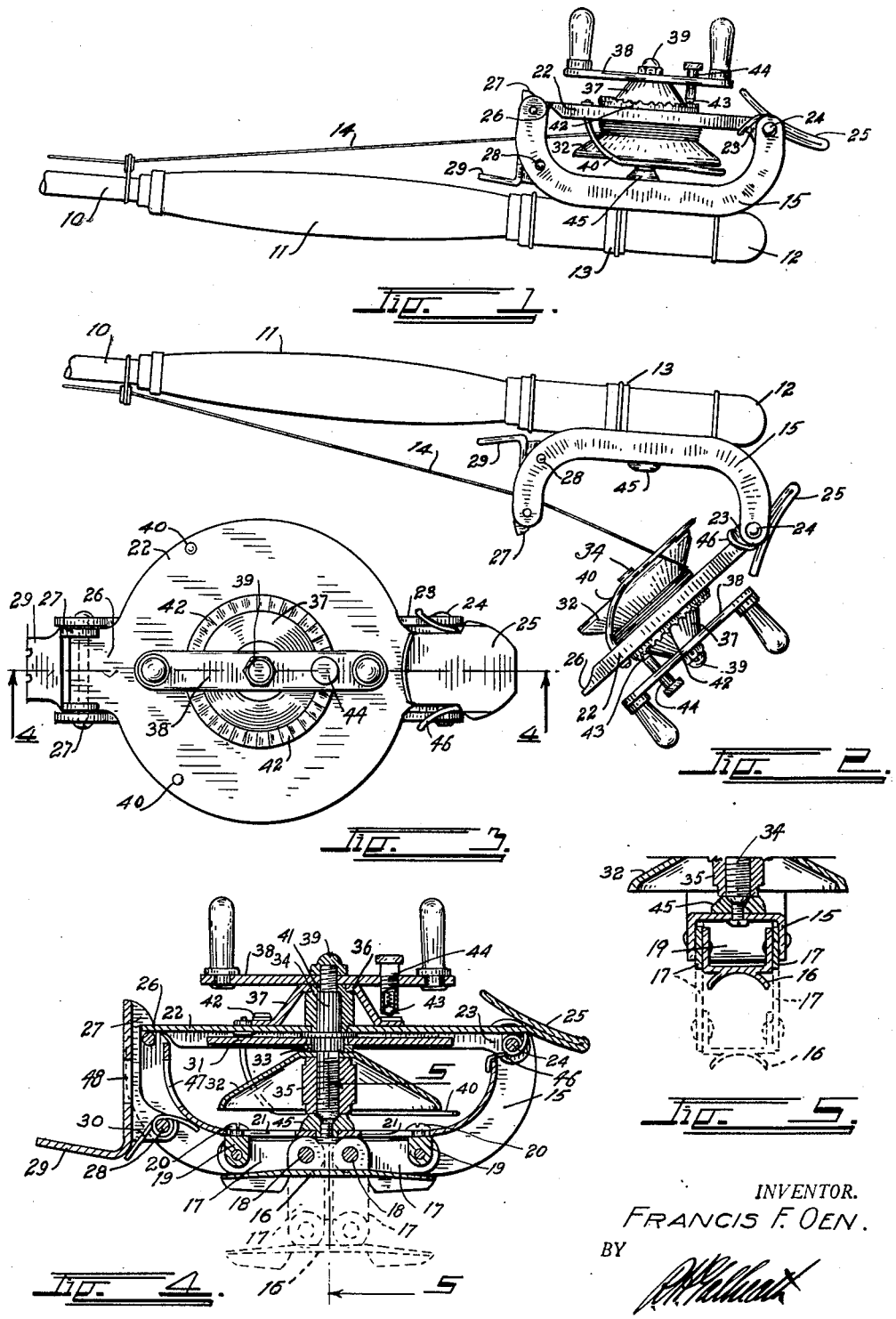

2,512,170

UNITED STATES PATENT OFFICE 2,512,170

FISHING REEL

Francis F. Oen, Denver, Colo.

Application April 30, 1946, Serial No. 666,087

7 Claims. (Cl. 242—84.5)

This invention relates to a fishing line reel of the type designed for attachment to a fishing pole, and has for its principal object the provision of a light-weight, easily operated and highly efficient swinging reel upon which the fish line may be wound in the usual manner, and from which the line can be pulled axially over the end of the reel without any rotation of the latter.

In fly fishing and bait casting, it is essential that the line be exceedingly free so that the light-weight bait and line can be whipped to a great distance. In the usual reel it is necessary for the line to rotate the reel, which, of course, creates resistance to the cast.

With the use of this invention there will be no resistance of any kind to the unreeling of the line, and no rotation of the reel itself, so that free and easy casts can be made to relatively great distances.

Another object of the invention is to provide a reel which will impart a rotating or spinning motion to the line so that it will create a rotating or spinning motion of the bait to enhance the attraction thereof.

A further object of the invention is to so construct the reel that it can be quickly and easily applied to either a straight handled fly rod or to an offset handle deep-seat fishing rod.

Other objects and advantages reside in the detailed construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the handle of a fly casting rod, illustrating the improved reel in place thereon arranged to reel in the line;

Fig. 2 is a similar view, illustrating the improved reel in the unreeling position;

Fig. 3 is an enlarged top view of the improved reel;

Fig. 4 is a cross-section therethrough, taken on the line 4—4, Fig. 3; and

Fig. 5 is a detail section of the reel, taken on the line 5—5, Fig. 4.

In Figs. 1 and 2 a typical fishing rod is indicated at 10, with its handle at 11, reel attaching cap 12, and slide ring at 13. A fish line is indicated at 14.

The improved reel comprises a U-shaped frame 15 having a channel-like cross-section. An arcuate rod pad 16 is adjustably secured to the frame 15 by means of two pairs of toggle links 17. One extremity of each pair of links 17 is mounted on a hinge pin 18 carried by the rod pad 16. The other extremity of each pair of links 17 is hingedly attached to a sliding post 19. The posts 19 are secured to the frame 15 by means of clamp screws 20 which are arranged to travel in elongated slots 21 in the frame 15.

For straight rods, as illustrated in Fig. 1, the two posts 19 are separated as far as possible before being secured by the screws 20. This draws the rod pad 16 tight against the frame 15 so that the latter can be attached relatively close to the rod axis. To apply the reel to rods of the type having an offset portion for receiving the reel, the posts 19 are moved toward each other so as to project the rod pad 16 outwardly, as indicated in broken line in Fig. 4, any desired distance to correspond to the depth of the offset of the rod.

The rod pad 16 is attached to the rod by slipping one extremity under the reel cap 12 and sliding the slide ring 13 over the other extremity thereof, as is usual in fishing rod and reel constructions.

A circular reel plate 22 having a projecting hinge ear 23 is hingedly mounted upon a hinge pin 24 extending through one extremity of the frame 15. A hinge spring 46 surrounds the pin 24 and acts to urge the plate 22 to the open position. The ear 23 extends beyond the hinge pin and is turned back upon itself to form a finger tab 25. The opposite side of the plate 22 carries a latch tongue 26 positioned to be engaged by a hooked latch member 27 to hold the plate 22 in the closed position.

The latch 27 is mounted on a latch pin 28 and terminates in an outwardly projecting releasing foot 29. Pressure on the foot 29 causes the latch 27 to release the tongue 26. The latch is constantly urged toward the tongue 26 by means of a hinge spring 30.

The line spool of the reel consists of a flat inner spool plate 31 and a conical spool plate 32 separated by means of a suitable spacer 33. The members 31, 32, and 33 are mounted on a spool shaft 34 by means of a clamp nut 35 which serves to clamp all of the members against a restraining flange 36 on the shaft 34. The extremity of the shaft 34 is tapered and extends beyond the nut 35. The flange 36 serves to position the plate 31 immediately inside of the plate 22.

The shaft 34 extends through a bushing 41 rotatably mounted in a bearing cup 37 secured on the outside of the plate 22. A winding crank 38 is secured on the extremity of the shaft 34 by means of an attachment nut 39. The nut 39 clamps the bushing 41 between the crank 38 and the flange 36 to form a solid unit. The bushing provides a bearing surface in the plate 22 and in the cap 37. The frame 15 is provided with an opening 47 for the passage of the line 14 and the latch 27 is provided with a similar line opening 48.

An arcuate line guard 40, consisting of a length of relatively stiff wire, extends around the major portion of the circumference of the conical reel plate 32 beyond and in close proximity to the edge thereof. The two extremities of the line guard are mounted in the plate 22 as shown in Fig. 3.

A braking boss 45 is mounted on and projects from the middle of the frame 15. This boss is provided with a tapered socket into which the tapered extremity of the spool shaft is forced by the closing action of the frame 15. This boss serves both as a bearing for the end of the shaft and as a retarding brake on the spool to prevent it from spinning or accidentally unwinding and entangling the line.

In some cases an annular, toothed track member 42 is secured around the base of the cap 37. A spring-projected click ball 43 can be caused to ride against the teeth of the member 42 by rotation of a ball and spring container 44 threaded through the handle 38 opposite the track member 42.

When making a cast, the latch is released, allowing the spring 46 to swing the plate 22 to the open position of Fig. 2. The line can now pull off from the end of the reel around the periphery of the conical spool plate. The wire guard 40 prevents the line from throwing outwardly from the reel and becoming entangled. The spool does not rotate during the unreeling operation. A rotating or spinning movement is imparted to the line which appears to assist the cast and imparts a spinning action to the bait. Since there are no moving parts, the resistance is reduced to a minimum.

When it is desired to retrieve the line, the reel plate 22 is snapped shut under the latch and the crank is rotated as usual.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A fishing reel comprising: a U-shaped frame; means for attaching the mid-portion of said frame to a fishing pole so that the extremities of said frame will extend outwardly therefrom; a reel plate hinged to one of said extremities and extending across said frame; a latch carried by the other extremity for engaging said reel plate when the latter is parallel to the mid-portion of said frame; a reel shaft extending through said reel plate; a reel mounted on one extremity of said shaft and positioned between the extremities of said frame; and means on the other extremity of said shaft for rotating said reel plate.

2. A fishing reel comprising: a U-shaped frame; means for attaching the mid-portion of said frame to a fishing pole so that the extremities of said frame will extend outwardly therefrom; a reel plate hinged to one of said extremities and extending across said frame; a latch carried by the other extremity for engaging said reel plate when the latter is parallel to the mid-portion of said frame; a reel shaft extending through said reel plate; a reel mounted on one extremity of said shaft and positioned between the extremities of said frame; means on the other extremity of said shaft for rotating said reel plate; and braking means carried by the mid-portion of said frame positioned to frictionally engage said reel when said plate is in the latched position to exert a retarding action thereon.

3. A fishing reel comprising: a frame; a rod pad member to be attached to a fishing rod; a pair of toggle links hinged to said pad member at their one extremities and extending in opposite directions from said pad member; a hinge member secured to the opposite extremity of each link; means for slidably attaching said hinge members to said frame to vary the distance between said pad member and said frame; and line reeling means mounted on said frame.

4. A fishing reel comprising: a U-shaped frame; means for attaching the mid-portion of said frame to a fishing pole so that the extremities of said frame will extend outwardly therefrom; a reel plate hinged to one of said extremities and extending across said frame; a latch pin mounted on the other extremity of said frame; a hooked latch rotatably mounted on said latch pin and engaging the opposite extremity of said reel plate when the latter is parallel to the mid-portion of said frame; a reel shaft extending through said reel plate; a reel mounted on one extremity of said shaft and positioned between the extremities of said frame; and means on the other extremity of said shaft for rotating said reel plate, said latch being provided with a line opening for guiding a fish line to and from said reel.

5. A fishing reel comprising: a U-shaped frame; means for attaching the mid-portion of said frame to a fishing pole so that the extremities of said frame will extend outwardly therefrom; a reel plate hinged to one of said extremities and extending across said frame; a latch pin mounted on the other extremity of said frame; a hooked latch rotatably mounted on said latch pin and engaging the opposite extremity of said reel plate when the latter is parallel to the mid-portion of said frame; a reel shaft extending through said reel plate; a reel mounted on one extremity of said shaft and positioned between the extremities of said frame; means on the other extremity of said shaft for rotating said reel plate, said latch being provided with a line opening for guiding a fish line to and from said reel; a releasing foot formed on, and projecting outwardly from, said latch for releasing the hooked extremity from said plate; and a spring urging said hooked extremity into engagement with said plate.

6. A fishing reel comprising: a U-shaped frame; means for attaching the mid-portion of said frame to a fishing pole so that the extremities of said frame will extend outwardly therefrom; a reel plate hinged to one of said extremities and extending across said frame; a latch carried by the other extremity for engaging said reel plate when the latter is parallel to the mid-portion of said frame; a reel shaft extending through said reel plate; a reel mounted on one extremity of said shaft and positioned between the extremities of said frame; means on the other extremity of said shaft for rotating said reel plate; a rod pad adapted to engage a fishing rod; two pairs of hinged links hinged at their one extremity to said rod pad in adjacent relation; a pair of hinge posts adjustably secured to said frame so that they may travel toward and away from each other; and means for hingedly securing the other extremity of each pair of links to one of said hinge posts.

7. A fishing reel comprising: a U-shaped frame; means for attaching the mid-portion of said frame to a fishing pole so that the extremities of said frame will extend outwardly therefrom; a reel plate hinged to one of said extremities and extending across said frame; a latch carried by the other extremity for engaging said reel plate when the latter is parallel to the mid-portion of said frame; a reel shaft extending through said reel plate; a reel mounted on one extremity of said shaft and positioned between the extremities of said frame; means on the other extremity of said shaft for rotating said reel plate; and an ear formed on said reel plate and extending beyond the hinge point of the latter to form a finger tab for swinging said plate to the closed position.

FRANCIS F. OEN.

REFERENCES CITED

The following references are of record in the file of this patent:

UNITED STATES PATENTS

| Number | Name | Date |
|---|---|---|
| 1,617,543 | Roberts | Feb. 15, 1927 |

FOREIGN PATENTS

| Number | Country | Date |
|---|---|---|
| 1,905 | Great Britain | of 1912 |
| 183,277 | Great Britain | July 27, 1922 |
| 211,406 | Great Britain | Feb. 21, 1924 |
| 322,718 | Great Britain | Dec. 12, 1929 |